(12) United States Patent
Chen

(10) Patent No.: US 11,624,392 B2
(45) Date of Patent: Apr. 11, 2023

(54) WING-SHAPED THRUST SCREW ASSEMBLY

(71) Applicant: Wei-Chih Chen, Taichung (TW)

(72) Inventor: Wei-Chih Chen, Taichung (TW)

(*) Notice: Subject to any disclaimer, the term of this patent is extended or adjusted under 35 U.S.C. 154(b) by 591 days.

(21) Appl. No.: 16/742,007

(22) Filed: Jan. 14, 2020

(65) Prior Publication Data
US 2021/0199148 A1 Jul. 1, 2021

(30) Foreign Application Priority Data
Dec. 27, 2019 (TW) .................................. 108148193

(51) Int. Cl.
*F16B 25/00* (2006.01)
*F16B 25/10* (2006.01)

(52) U.S. Cl.
CPC ...... *F16B 25/0089* (2013.01); *F16B 25/0063* (2013.01); *F16B 25/103* (2013.01); *F16B 25/00* (2013.01); *F16B 25/0031* (2013.01)

(58) Field of Classification Search
CPC .............. F16B 25/0031; F16B 25/0057; F16B 25/0063; F16B 25/0089; F16B 25/103; F16B 33/002; F16B 35/041; F16B 39/00; F16B 25/00
USPC ................... 411/386, 387.1, 387.2, 411, 424
See application file for complete search history.

(56) References Cited

U.S. PATENT DOCUMENTS

| | | | | |
|---|---|---|---|---|
| 3,478,639 A | * | 11/1969 | Gruca | F16B 5/0275 411/387.1 |
| 3,682,507 A | * | 8/1972 | Waud | F16B 25/0031 411/413 |
| 3,869,219 A | * | 3/1975 | Wilson | E04D 3/3606 403/283 |
| 3,916,757 A | * | 11/1975 | Wilson | F16B 25/0031 411/394 |
| 4,255,959 A | * | 3/1981 | Muenchinger | B21H 3/027 72/469 |
| 4,764,069 A | | 8/1988 | Reinwall et al. | |
| 5,154,559 A | * | 10/1992 | Wagner | F16B 41/002 411/176 |
| 5,199,152 A | * | 4/1993 | Wagner | F16B 41/002 29/451 |

(Continued)

FOREIGN PATENT DOCUMENTS

TW M311788 U 5/2007
TW I664037 B 7/2019

*Primary Examiner* — Roberta S Delisle
(74) *Attorney, Agent, or Firm* — Alan D. Kamrath; Karin L. Williams; Mayer & Williams PC

(57) ABSTRACT

A thrust screw assembly includes a thrust screw and two threading dies for working the thrust screw. The thrust screw includes a first shank, a second shank, an external thread, and a thrust member. Each of the threading dies is provided with an external thread forming section and a flat portion forming section. In a first molding process, the first shank is worked to form the thrust member with two wing-shaped stop pieces. In a second molding process, the second shank is processed by the external thread forming section of each of the two threading dies to form the external thread on the second shank, and the two wing-shaped stop pieces is processed by the flat portion forming section of each of the two threading dies to form two flat portions on the two wing-shaped stop pieces simultaneously.

8 Claims, 14 Drawing Sheets

(56) References Cited

U.S. PATENT DOCUMENTS

| | | | | |
|---|---|---|---|---|
| 5,987,837 | A | * 11/1999 | Nelson | F16B 25/0089 |
| | | | | 52/404.2 |
| 6,050,765 | A | 4/2000 | McGovern et al. | |
| 2003/0017028 | A1 | * 1/2003 | Chu | E04D 3/3606 |
| | | | | 411/387.2 |
| 2007/0059122 | A1 | * 3/2007 | Lin | F16B 5/0275 |
| | | | | 411/412 |
| 2007/0224019 | A1 | * 9/2007 | Hale | F16B 25/0063 |
| | | | | 411/387.2 |
| 2007/0292235 | A1 | * 12/2007 | Shinjo | F16B 35/065 |
| | | | | 411/386 |
| 2013/0216329 | A1 | * 8/2013 | Deutscher | F16B 25/10 |
| | | | | 411/387.2 |

* cited by examiner

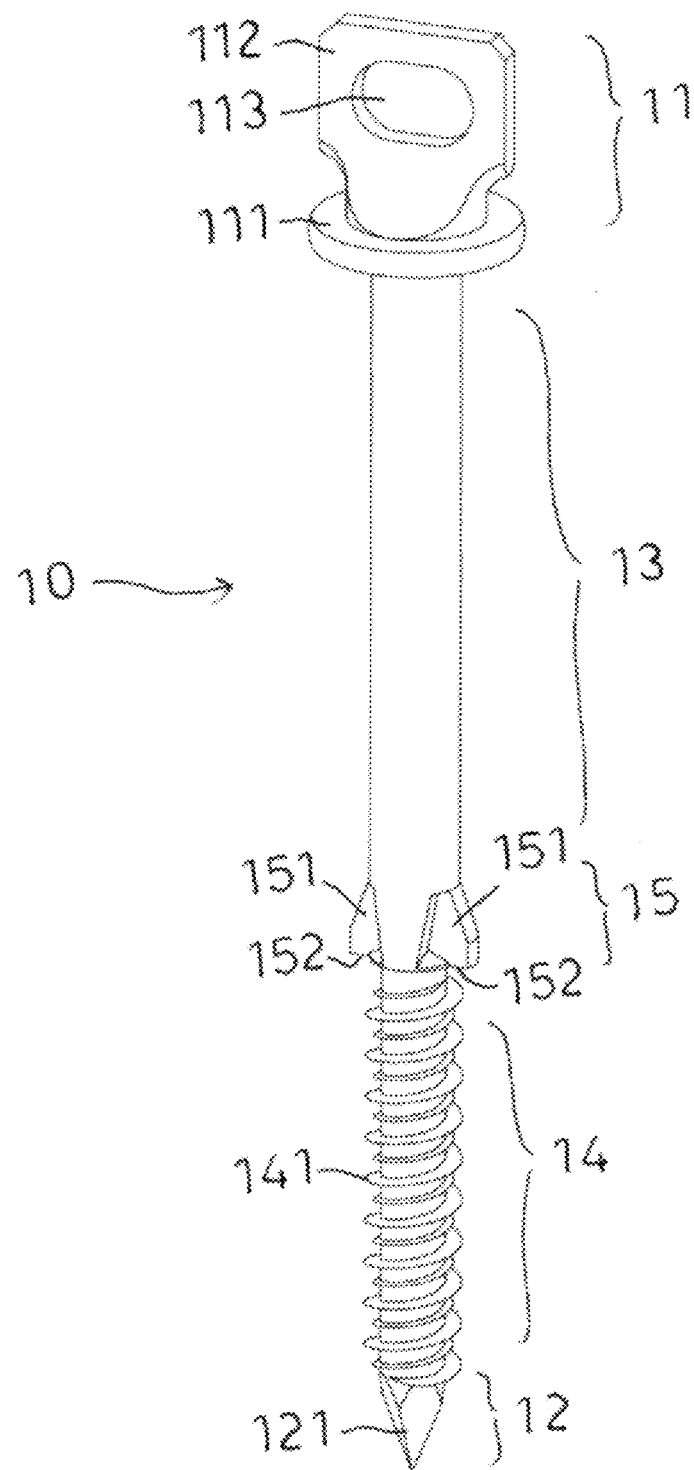
FIG·1

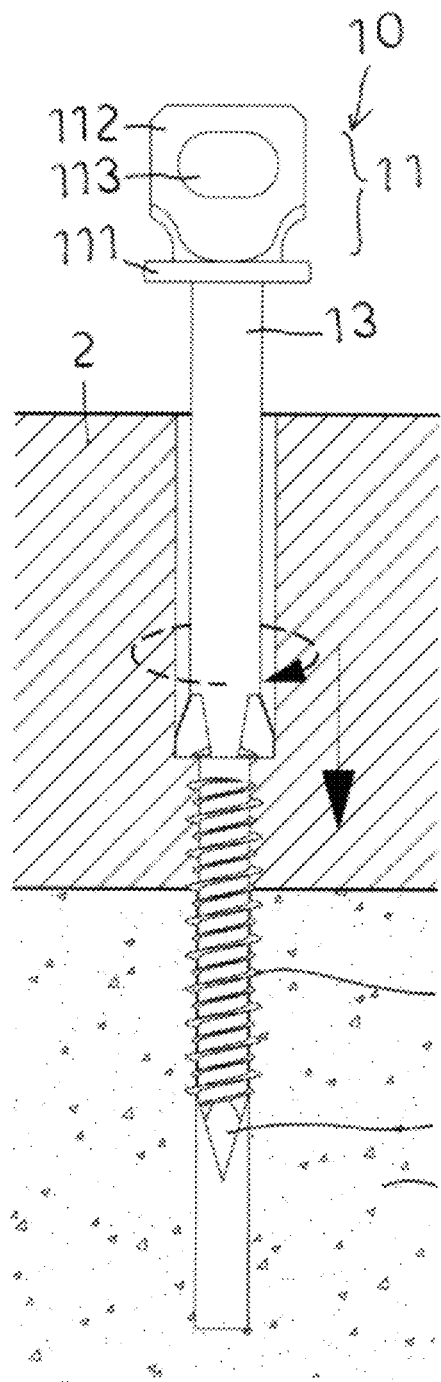
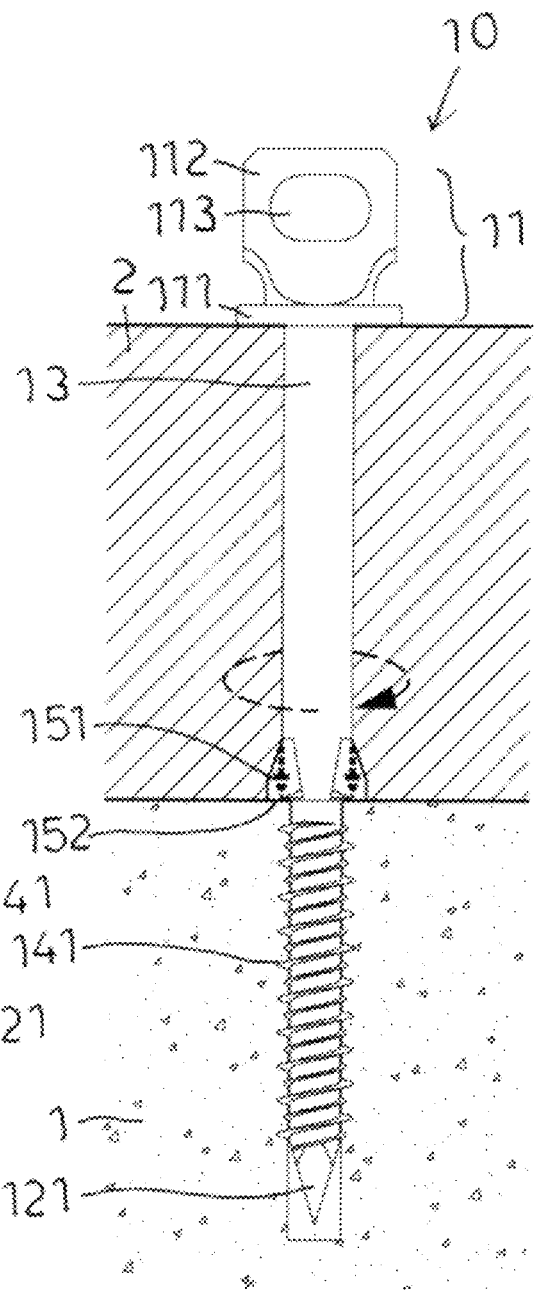
FIG·2    FIG·3

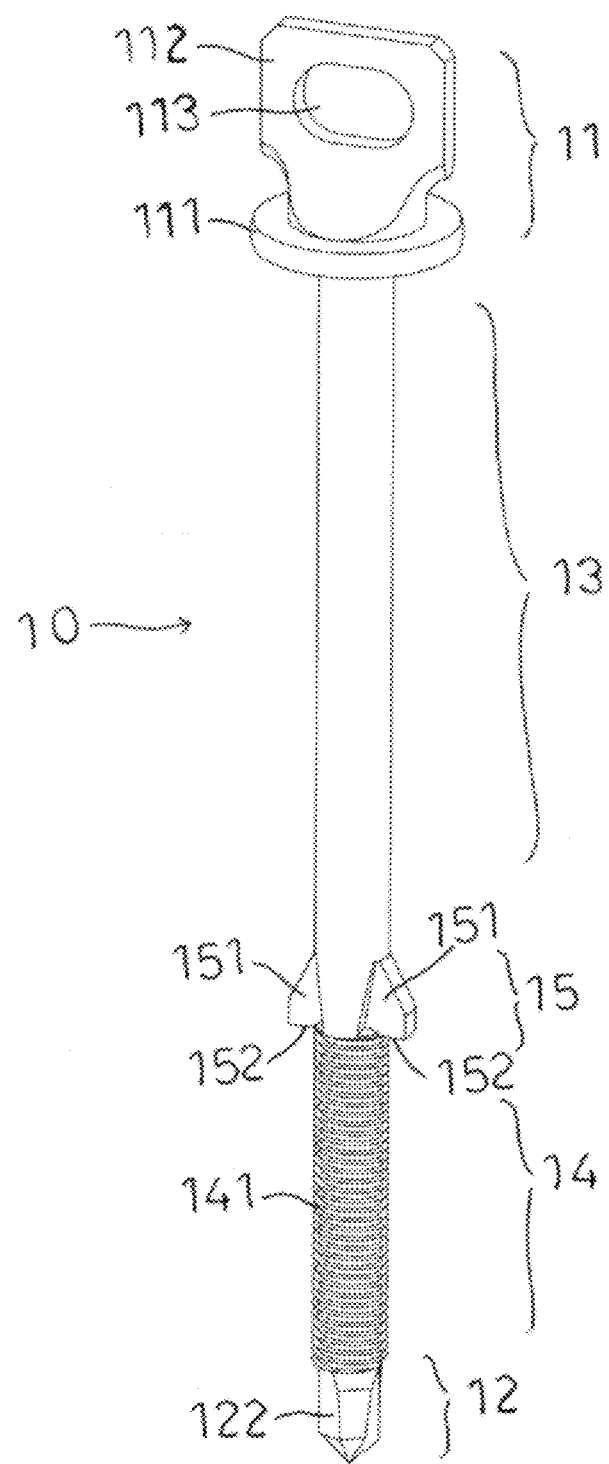
FIG·4

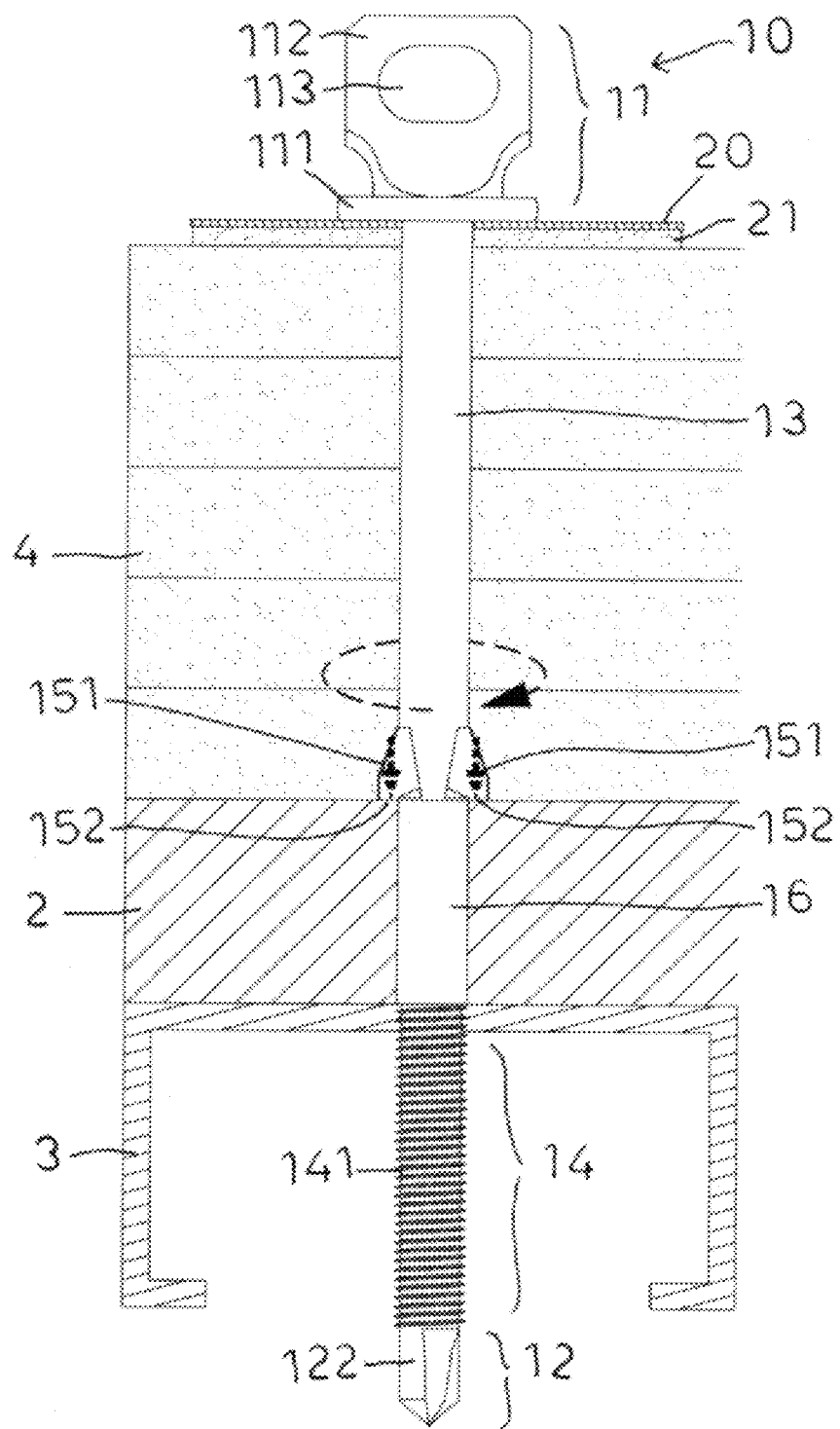
FIG·5

WING-SHAPED THRUST SCREW ASSEMBLY

BACKGROUND OF THE INVENTION

1. Field of the Invention

The present invention relates to a screw and, more particularly, to a wing-shaped thrust screw (or self-tapping screw).

2. Description of the Related Art

A conventional fastener for logs and fastening technique therefor was disclosed in the U.S. Pat. No. 6,050,765. The fastener is provided with two enlarged portions which are mainly used for hole expansion and chip removal during cutting. The two enlarged portions do not have a thrust function and cannot prevent a further screwing motion of the external thread.

A conventional anchor for masonry veneer walls was disclosed in the U.S. Pat. No. 4,764,069. The tail end of the wall anchor is provided with an internally threaded hole for locking a headless screw, so that the headless screw can be locked and fixed in the internally threaded hole of the wall anchor. The headless screw has a tail provided with a drill tip. The outer diameter of the tail end of the wall anchor is larger than that of the thread of the headless screw, thereby forming a thrust part to prevent a further screwing motion of the headless screw. The wall anchor and the headless screw are produced individually. The wall anchor and the headless screw are made the zinc alloy which is cast and then tapped to form the thread, and finally the headless screw is locked in the internal thread hole of the wall anchor. However, the wall anchor and the headless screw are not formed integrally, and have a complicated working process, thereby increasing the cost of fabrication.

A conventional stainless steel self-tapping screw was disclosed in the Taiwanese Patent Publication No. M311788. The stainless steel screw has a top provided with an enlarged cap portion, a middle provided with a screw body, and a bottom provided with a drill blade. The screw body is provided with a thread section and two convex fin portions. When the self-tapping screw is used to lock a non-metal plate and a metal skeleton, the two convex fin portions enlarge the bore of the non-metal plate, so that a space is kept between the screw body and the non-metal plate, to provide an expansion space when heat expansion occurs. Each of the two convex fin portions is a thin plate, such that when the two convex fin portions pass through the non-metal plate and touch the metal skeleton, the two convex fin portions are broken and detached from the screw body, and will not affect the metal skeleton. Thus, the screw body and the metal skeleton are connected steadily. However, the two convex fin portions do not have a thrust function, and cannot stop a further screwing motion of the thread section.

A conventional self-tapping screw was disclosed in the Taiwanese Patent Publication No. 1664037, and comprises a head, a first shank, a second shank, and a drilling member. The head is provided with a restriction portion which is provided with a rotation portion which is provided with a through hole. The drilling member includes a pointed portion. Thus, the rotation portion is driven and rotated by a driving tool to rotate the self-tapping screw. The second shank is provided with an external thread. A thrust member is formed between the first shank and the external thread. The thrust member includes a stop ring and a groove. A washer is mounted on the bottom of the stop ring, and a resilient washer is mounted on the bottom of the washer. A perforation is formed in the washer and the resilient washer. In fabrication, the thrust member is formed by extrusion, such that a material for forming the groove is squeezed downward to form the stop ring. Thus, the stop ring has a diameter slightly greater than that of the external thread. In operation, the rotation portion is driven and rotated by the driving tool to rotate the self-tapping screw, such that the pointed portion is drilled through a cement, and the external thread is screwed into the cement. When the stop ring touches the washer, the self-tapping screw stops rotating. However, when the self-tapping screw is deflected from the washer, the stop ring easily passes through the perforation, such that the stop ring is deformed or broken by the washer, and the thrust member cannot stop a further movement of the external thread.

BRIEF SUMMARY OF THE INVENTION

The primary objective of the present invention is to provide a wing-shaped thrust screw that stops rotation during a preset distance.

In accordance with the present invention, there is provided a thrust screw assembly comprising a thrust screw and two threading dies for working the thrust screw. The thrust screw includes a head, a first shank, a second shank, and a drilling member. The first shank and the second shank are arranged between the head and the drilling member. The second shank is provided with an external thread. The first shank is provided with a thrust member. The thrust member includes two wing-shaped stop pieces and two flat portions. The two flat portions have an outer diameter greater than that of the external thread. Thus, the two flat portions of the thrust member stop a further screwing motion of the external thread. Each of the two threading dies is provided with an external thread forming section corresponding to the external thread of the thrust screw. Each of the two threading dies is provided with a flat portion forming section corresponding to the thrust member of the thrust screw. The flat portion forming section is provided with a cutting groove. The flat portion forming section has a first end provided with a narrow portion, and a second end provided with a wide portion. The flat portion forming section has a dimension increased gradually from the narrow portion to the wide portion. In a first molding process, the first shank is worked by stamping to form the thrust member with the two wing-shaped stop pieces. In a second molding process, the second shank is processed by the external thread forming section of each of the two threading dies to form the external thread on the second shank, and the two wing-shaped stop pieces is processed by the flat portion forming section of each of the two threading dies to form the two flat portions on the two wing-shaped stop pieces simultaneously. The cutting groove cuts the highest point of an outer edge of each of the two wing-shaped stop pieces into each of the two flat portions.

According to the primary advantage of the present invention, the two flat portions have an outer diameter greater than that of the external thread, to stop a further screwing motion of the external thread.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 1 is a perspective view of a thrust screw in accordance with the first preferred embodiment of the present invention.

FIG. 2 is a schematic operational view showing a screwing operation of the thrust screw as shown in FIG. 1.

FIG. 3 is a schematic operational view showing finish of the screwing operation of the thrust screw as shown in FIG. 1.

FIG. 4 is a perspective view of a thrust screw in accordance with the second preferred embodiment of the present invention.

FIG. 5 is a schematic operational view showing finish of the screwing operation of a thrust screw in accordance with the third preferred embodiment of the present invention.

Figure 16:
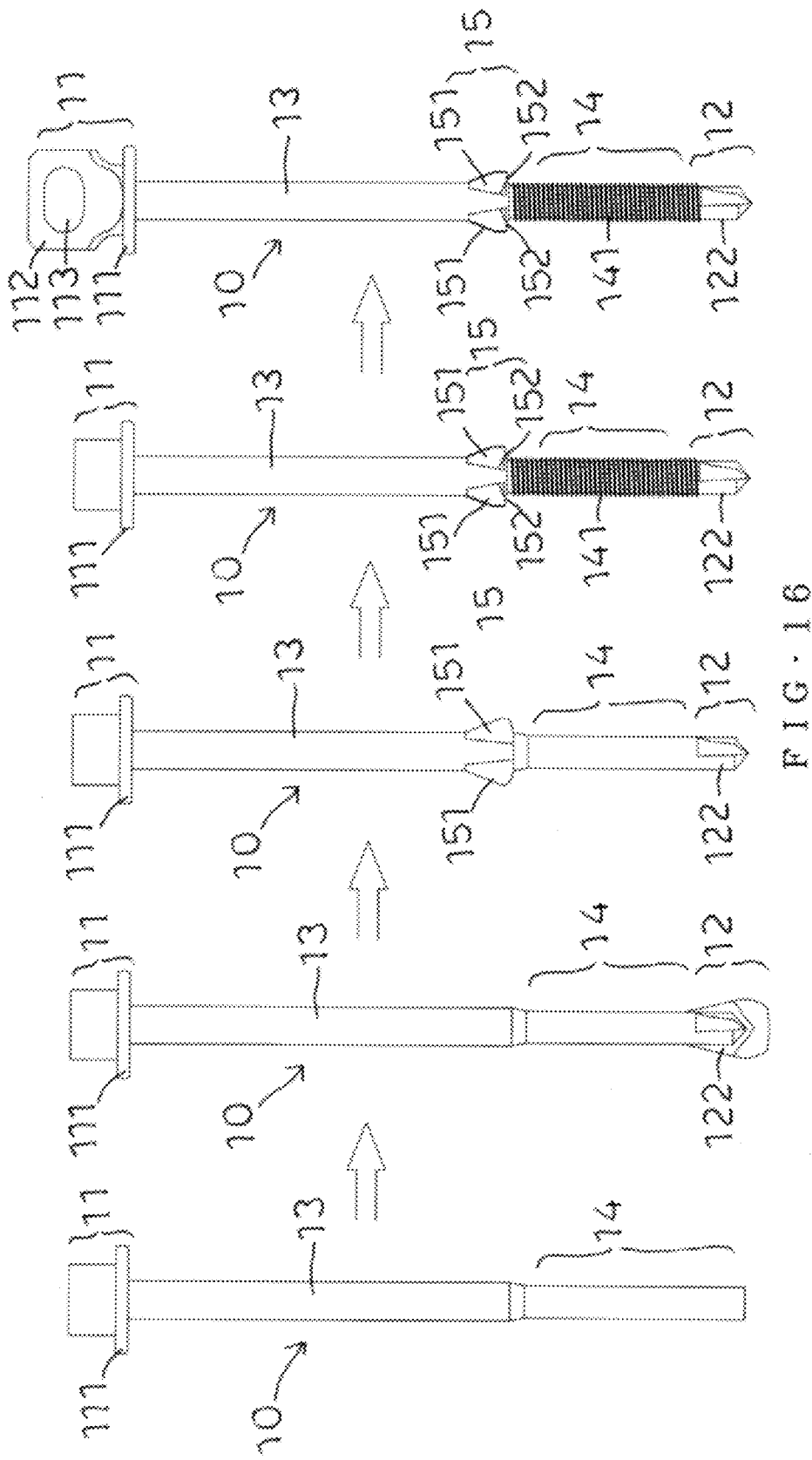

FIG. 16 includes plane views showing successive procedures for working the thrust screw.

DETAILED DESCRIPTION OF THE INVENTION

Referring to the drawings and initially to FIGS. 1-3, a thrust screw assembly in accordance with the preferred embodiment of the present invention comprises a thrust screw 10. The thrust screw 10 includes a head 11, a first shank 13, a second shank 14, and a drilling member 12. The head 11 is provided with a restriction portion 111 disposed horizontally. The restriction portion 111 is provided with a rotation portion 112 disposed vertically. The rotation portion 112 is a sheet plate. The rotation portion 112 is provided with a through hole 113. Thus, the rotation portion 112 is driven and rotated by a driving tool to rotate the thrust screw 10. The drilling member 12 includes a pointed (or conic or tapered) portion 121. The first shank 13 and the second shank 14 are arranged between the head 11 and the drilling member 12. The second shank 14 is provided with an external thread 141. The first shank 13 is provided with a thrust member (or stop member) 15 corresponding to the external thread 141. The thrust member 15 is connected with the external thread 141 of the second shank 14 and includes two wing-shaped (or fin-shaped) stop pieces 151 and two flat portions 152. The two wing-shaped stop pieces 151 are formed on and protrude outward from the first shank 13. The two flat portions 152 are formed on the two wing-shaped stop pieces 151 respectively and correspond to the external thread 141. The two flat portions 152 have an outer diameter (or a dimension) greater than that of the external thread 141 and greater than that of the first shank 13. Thus, the two flat portions 152 of the thrust member 15 stop a further movement of the external thread 141 and prevent a further screwing motion of the external thread 141.

In fabrication, the first shank 13 is worked by a first molding process (stamping, punching or pressing) to form the thrust member 15 with the two wing-shaped stop pieces 151, and the thrust member 15 is worked by a second molding process (turning or cutting) to form the two flat portions 152 on the two wing-shaped stop pieces 151 respectively. Preferably, the two wing-shaped stop pieces 151 are formed integrally on the first shank 13 by stamping, punching or pressing, and the two flat portions 152 are formed on the two wing-shaped stop pieces 151 respectively by turning or cutting.

In operation, referring to FIGS. 2 and 3 with reference to FIG. 1, a first article 2 is placed on a cement (or concrete) 1. When the rotation portion 112 is driven and rotated by the driving tool, the thrust screw 10 is rotated, such that the pointed portion 121 of the drilling member 12 is drilled through the first article 2 into the cement 1, and the external thread 141 is screwed through the first article 2 into the cement 1 as shown in FIG. 2. When the two flat portions 152 of the thrust member 15 touch the cement 1, and the restriction portion 111 of the head 11 touches the first article 2 as shown in FIG. 3, the thrust screw 10 stops rotating.

Referring to FIG. 4, the drilling member 12 includes a drill tip 122.

Referring to FIG. 5, the thrust member 15 is spaced from the external thread 141, and the thrust screw 10 further includes a third shank 16 located between the thrust member 15 and the external thread 141, a washer 20 mounted on the first shank 13 and located under the head 11, and an elastic cushion (or pad or spacer or washer) 21 mounted on the first shank 13 and located under the washer 20. The washer 20 rests on a bottom of the restriction portion 111 of the head 11. The elastic cushion 21 rests on a bottom of the washer 20.

In operation, the first article 2 is placed on a metal article 3, and a plurality of second articles 4 are placed on the first article 2. When the rotation portion 112 is driven and rotated by the driving tool, the thrust screw 10 is rotated, such that the drill tip 122 of the drilling member 12 is drilled through the second articles 4, the first article 2, and the metal article 3, and the external thread 141 is screwed through the second articles 4, the first article 2, and the metal article 3. When the two flat portions 152 of the thrust member 15 touch the first article 2, and the elastic cushion 21 touches the uppermost one of the second articles 4, the thrust screw 10 stops rotating. In such a manner, the washer 20 and the elastic cushion 21 separate the head 11 from the second articles 4 to prevent the head 11 from pressing the second articles 4 directly. In addition, the elastic cushion 21 has a resilient feature to enhance the screwing and locking force of the external thread 141, such that the washer 20 and the elastic cushion 21 rest on the second articles 4 smoothly and evenly.

Figure 6:
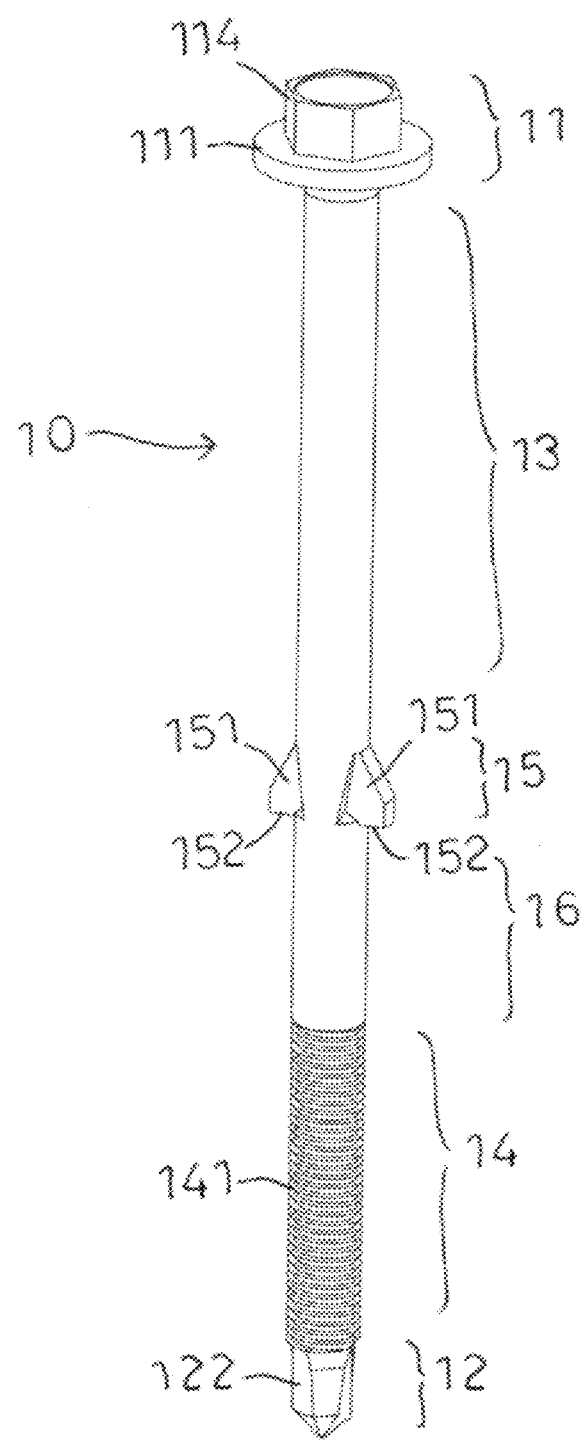
FIG. 6 is a perspective view of a thrust screw in accordance with the fourth preferred embodiment of the present invention.

Referring to FIG. 6, the restriction portion 111 is provided with a rotation portion 114 disposed vertically. Preferably, the rotation portion 114 is a hexagonal nut. Thus, the rotation portion 114 is driven and rotated by a driving tool, such as a socket wrench, to rotate the thrust screw 10.

Figure 7:
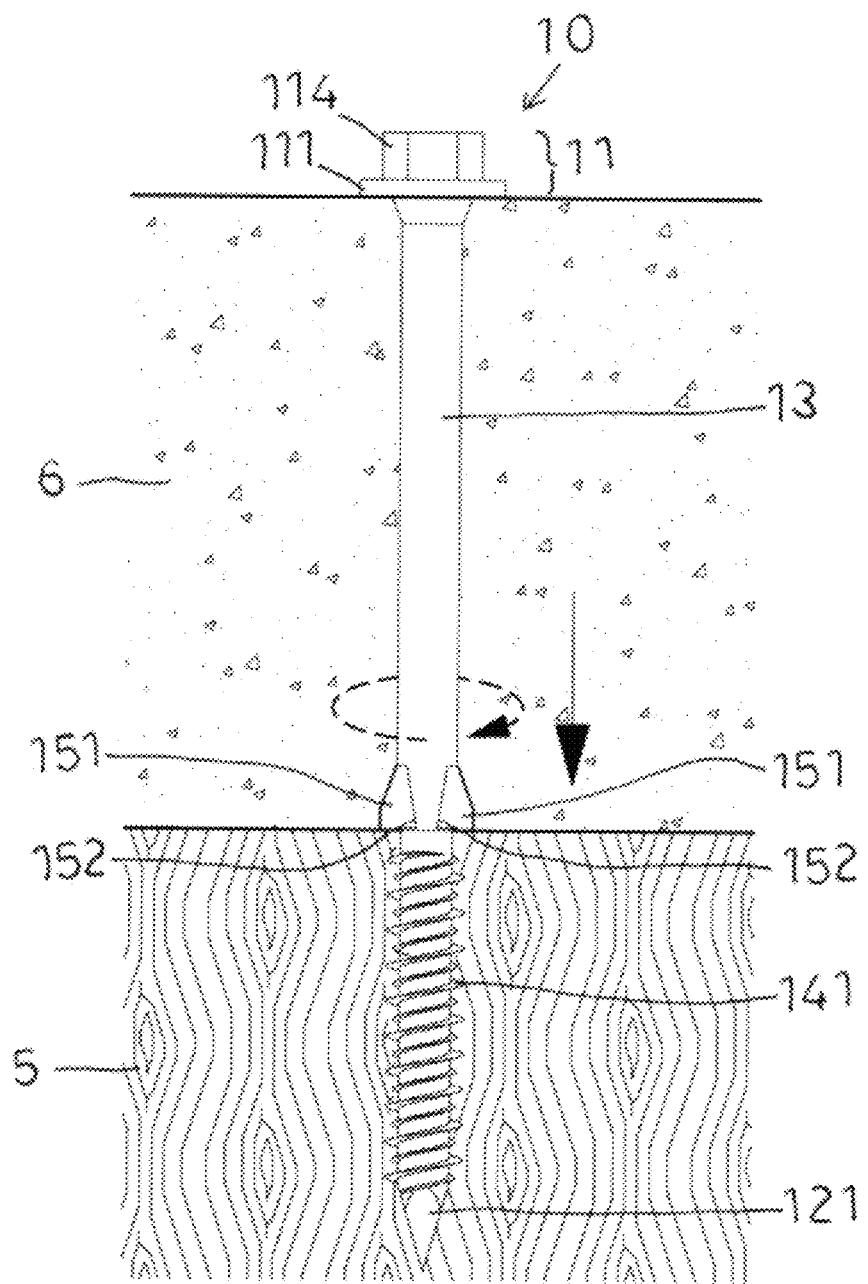
FIG. 7 is a schematic operational view showing finish of the screwing operation of a thrust screw in accordance with the fifth preferred embodiment of the present invention.

In operation, referring to FIG. 7, when the rotation portion 114 is driven and rotated by the driving tool, the thrust screw 10 is rotated, such that the pointed portion 121 of the drilling member 12 is drilled into a wood element 5, and the external thread 141 is screwed into the wood element 5. When the two flat portions 152 of the thrust member 15 touch the wood element 5, the thrust screw 10 stops rotating. Then, a cement 6 is poured to the wood element 5. The height of the cement 6 increases gradually until the cement 6 touches the restriction portion 111 of the head 11.

Figure 8:
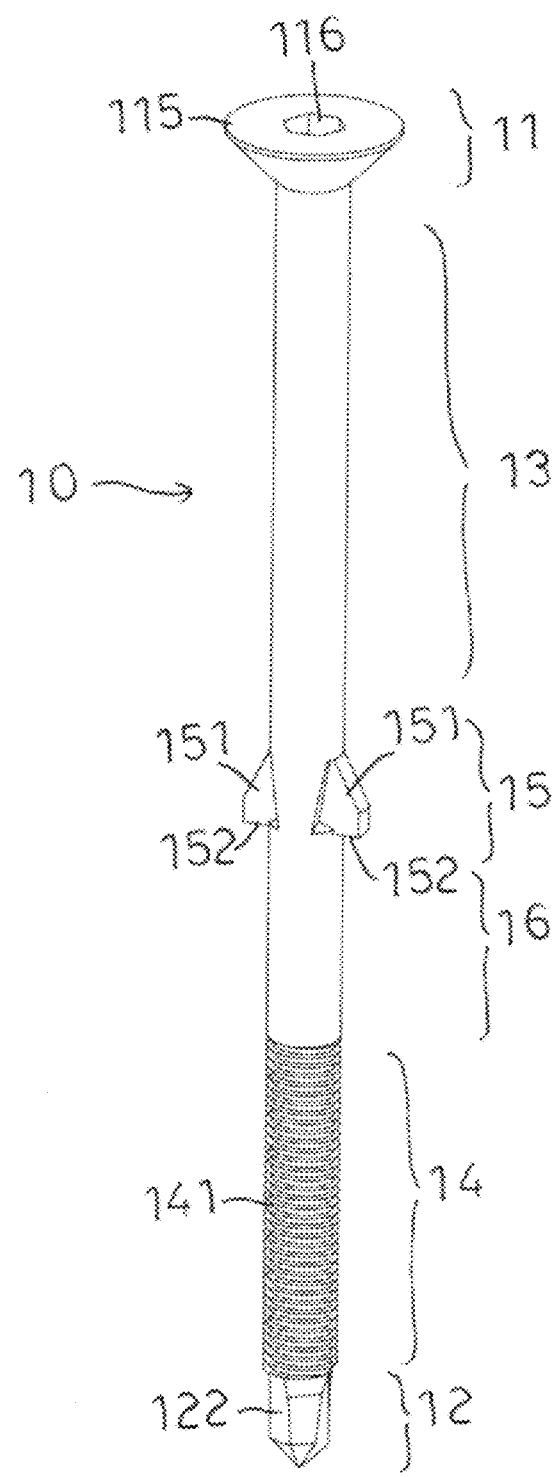
FIG. 8 is a perspective view of a thrust screw in accordance with the sixth preferred embodiment of the present invention.

Referring to FIG. 8, the head 11 is directly provided with a rotation portion 115. The rotation portion 115 has a circular (or tapered or conic) shape and is provided with a hexagonal driving slot 116. Thus, when a driving tool, such as a hex wrench, is mounted in the driving slot 116, the rotation portion 115 is driven and rotated by the driving tool to rotate the thrust screw 10.

Referring to FIGS. 9-15, the thrust screw assembly further comprises two threading dies 30 for working the thrust screw 10. Each of the two threading dies 30 is provided with an external thread forming section 32 corresponding to the external thread 141 of the thrust screw 10. Each of the two threading dies 30 is provided with an antiskid section 31 located at a starting position of the external thread forming section 32. Each of the two threading dies 30 is provided with a flat portion forming section 33 corresponding to the thrust member 15 of the thrust screw 10. The flat portion forming section 33 is located above the external thread forming section 32 and is provided with a cutting groove 331 having an elongate shape. The flat portion forming section 33 has a first end (or starting position) provided with a narrow portion 333 and a second end (or ending position) provided with a wide portion 332 having a dimension (or width) greater than that of the narrow portion 333. The wide portion 332 and the narrow portion 333 are located under the cutting groove 331. The flat portion forming section 33 has a dimension (or width) increased gradually from the narrow portion 333 to the wide portion 332.

In practice, the cutting groove 331 is located at a top of the external thread 141 of the thrust screw 10, and cuts the highest point "A" of an outer edge of each of the two wing-shaped stop pieces 151 into each of the two flat portions 152. Thus, the two threading dies 30 push and press the thrust screw 10 to form the two flat portions 152 integrally during the threading process of the external thread 141.

In the preferred embodiment of the present invention, each of the two threading dies 30 is provided with an evasion opening (or an escape opening or a dodging opening or a receiving space) 34 and a plane 35 corresponding to the drill tip 122 of the thrust screw 10. The plane 35 has a rear end provided with an arcuate face 36. Thus, the drill tip 122 of the thrust screw 10 extends into and is hidden in the evasion opening 34 during threading of the external thread 141 and during cut forming of the two flat portions 152, such that the drill tip 122 of the thrust screw 10 is not damaged during working of the two threading dies 30.

Figures 10, 11:
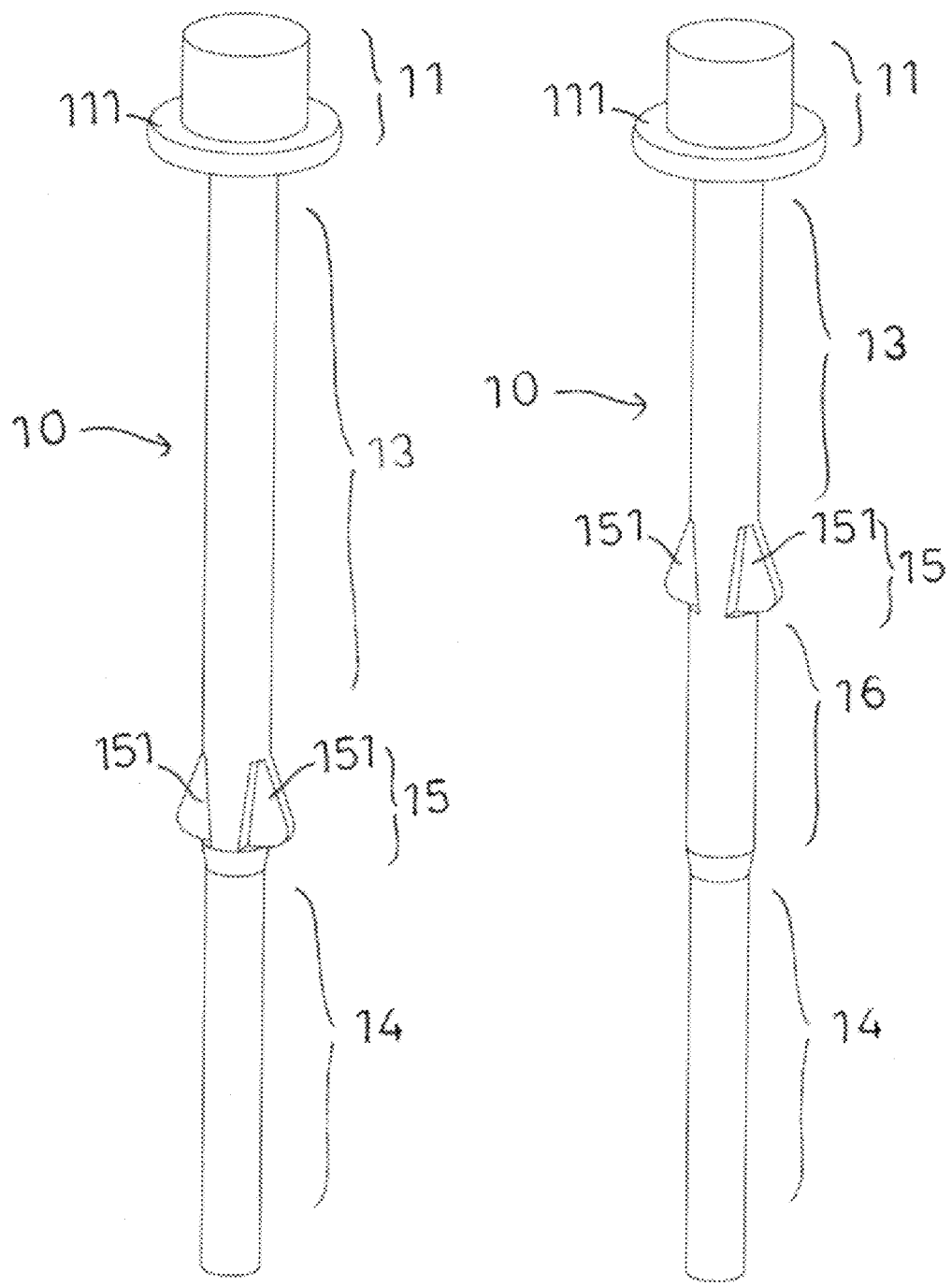
FIG. 10 is a perspective view showing formation of two wing-shaped stop pieces on the thrust screw in accordance with the first preferred embodiment of the present invention.
FIG. 11 is another perspective view showing formation of two wing-shaped stop pieces on the thrust screw in accordance with the fourth preferred embodiment of the present invention.
Figure 12:
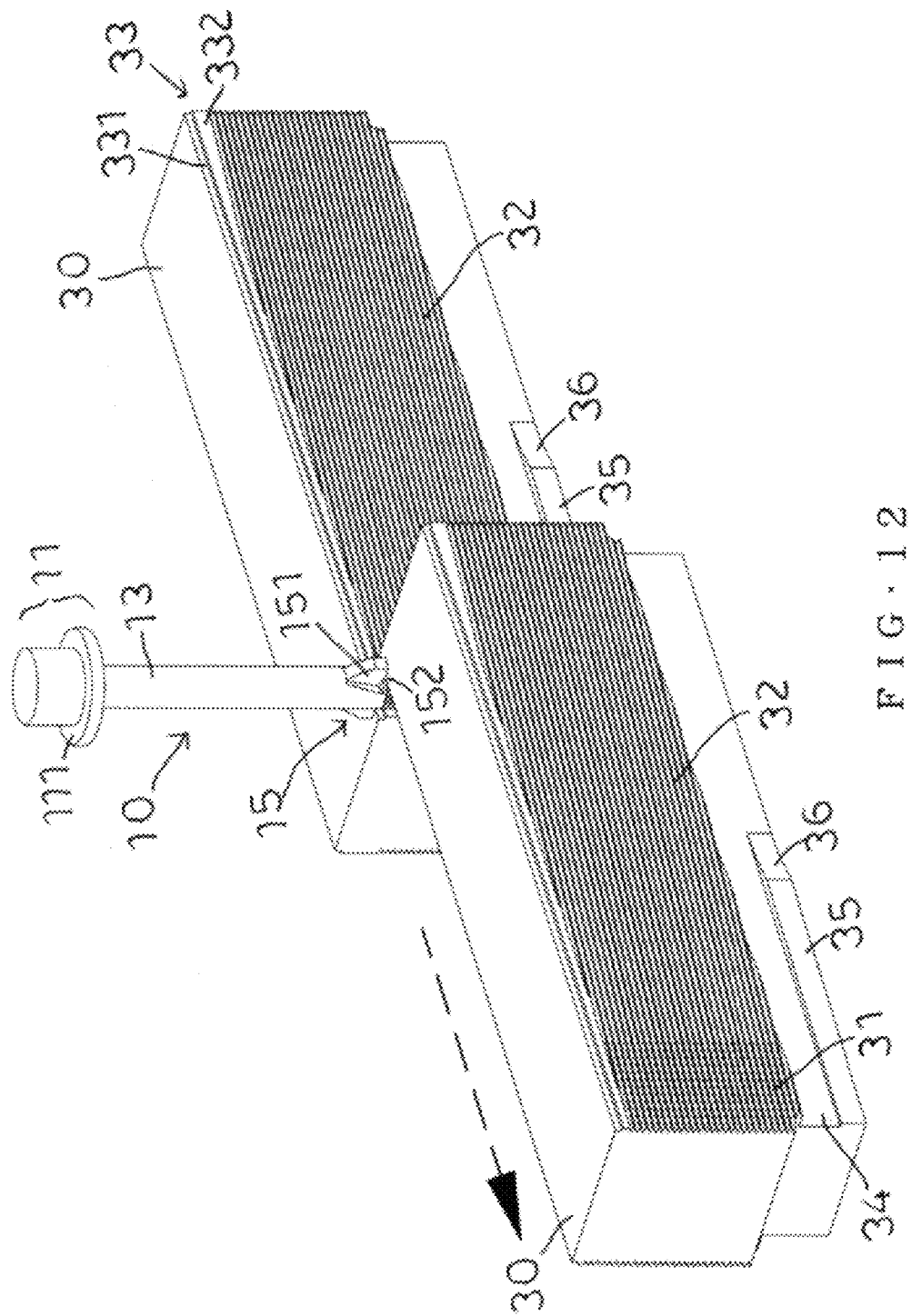
FIG. 12 is a perspective operational view showing the start state of the threading process of the thrust screw by two threading dies.
Figure 13:
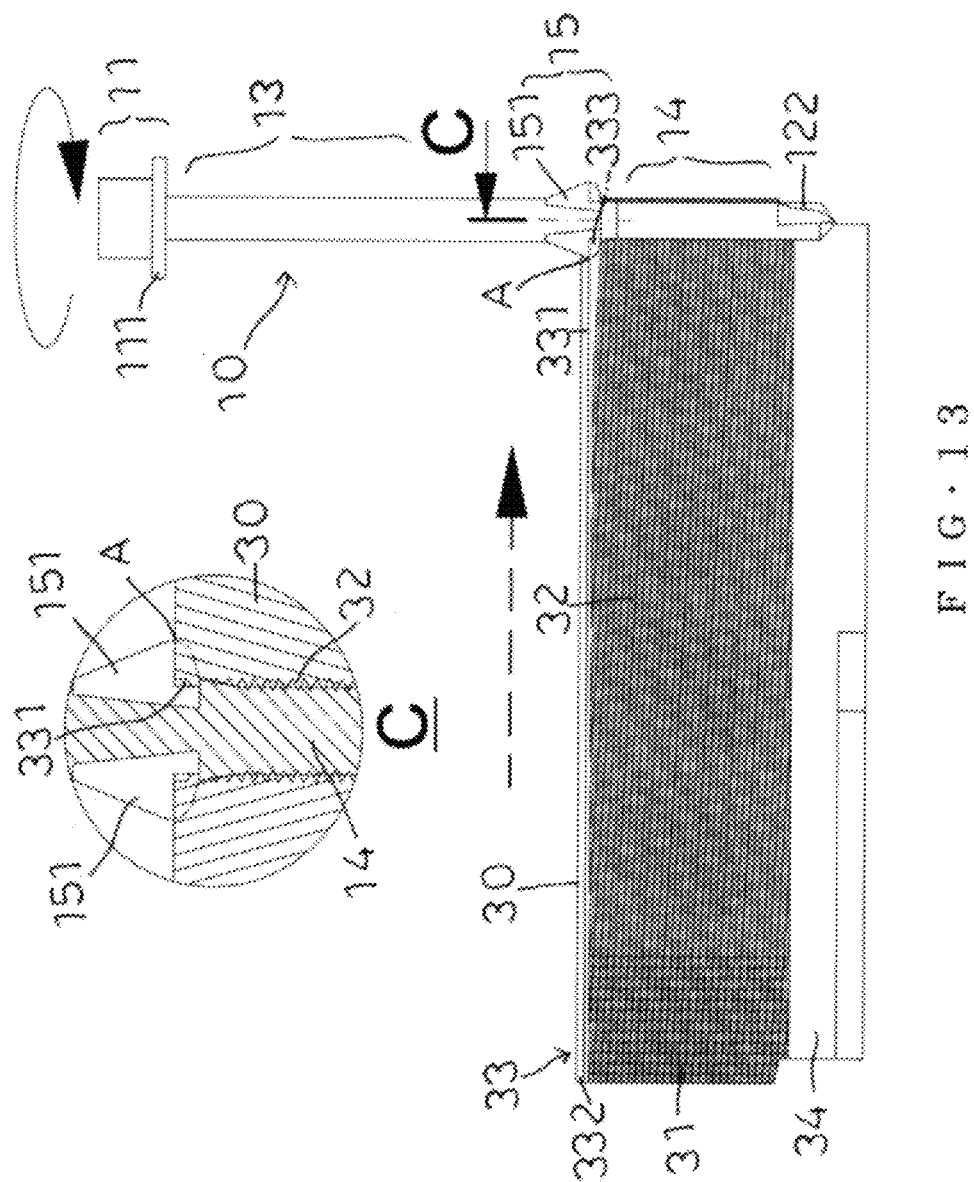
FIG. 13 is a plane operational view showing the start state of the threading process of the thrust screw, and a cross-sectional view taken along mark "C".

As shown in FIGS. 10 and 11, in the first molding process, the first shank 13 of the thrust screw 10 is worked by stamping to integrally form the thrust member 15 with the two wing-shaped stop pieces 151. The height of the thrust member 15 is adjusted freely according to the thickness of the workpiece.

Figure 9:
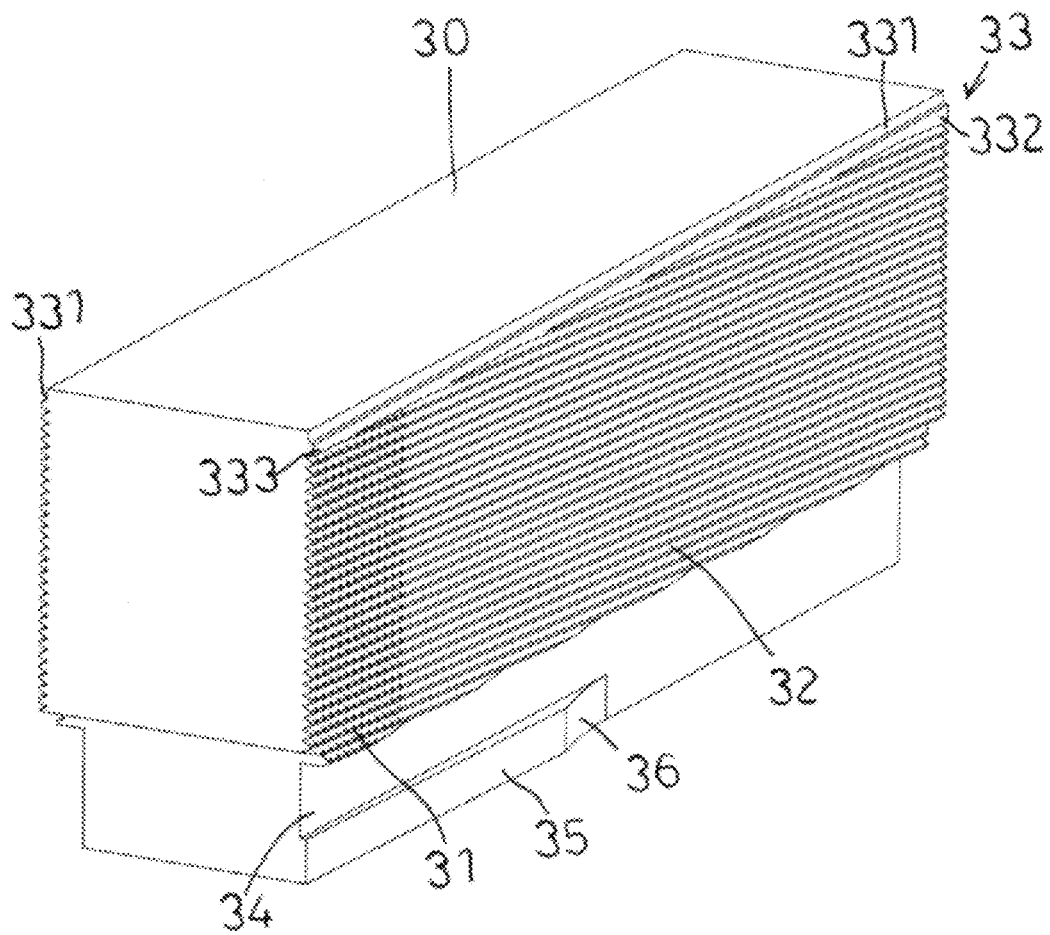
FIG. 9 is a perspective view of a threading die in accordance with the preferred embodiment of the present invention.

In the second molding process, referring to FIGS. 12-15 with reference to FIG. 9, the thrust screw 10 is sandwiched between the two threading dies 30 and correspond to the antiskid section 31 of each of the two threading dies 30. Then, one of the two threading dies 30 is fixed without movement, and the other one of the two threading dies 30 is moved. In such a manner, the external thread forming section 32 of each of the two threading dies 30 performs a threading process on the second shank 14, and the flat portion forming section 33 of each of the two threading dies 30 performs a cutting process on the two wing-shaped stop pieces 151 simultaneously, so as to form the external thread 141 on the second shank 14, and to form the two flat portions 152 on the two wing-shaped stop pieces 151 simultaneously, such that the thrust screw 10 is integrally formed with the external thread 141 and the two flat portions 152 simultaneously. At this time, the cutting groove 331 of each of the two threading dies 30 cuts the highest point "A" of the outer edge of each of the two wing-shaped stop pieces 151 into each of the two flat portions 152. It is noted that, the width of the flat portion forming section 33 is increased gradually from the narrow portion 333 to the wide portion 332, such that the cutting groove 331 of each of the two threading dies 30 gradually cuts the highest point "A" of the outer edge of each of the two wing-shaped stop pieces 151 into each of the two flat portions 152.

Figure 14:
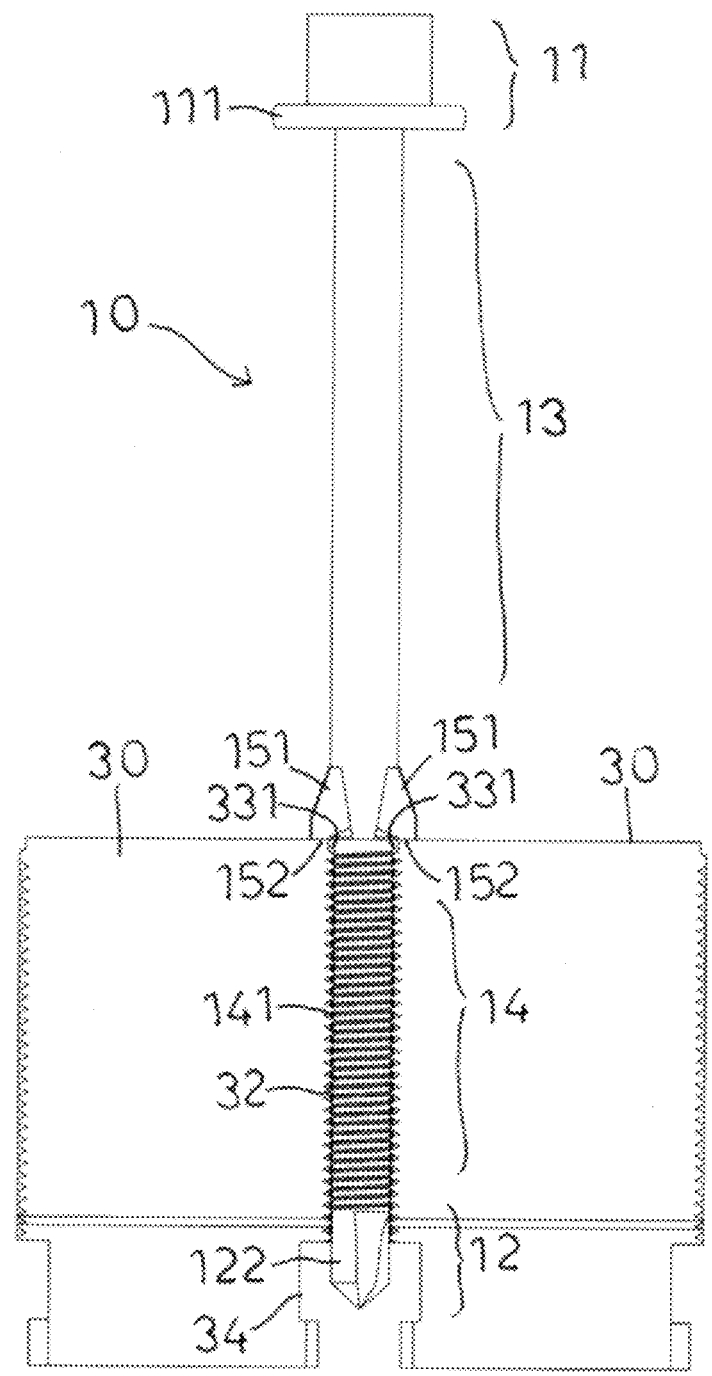
FIG. 14 is a side view showing the drill tip of the thrust screw is received in the opening of each of the two threading dies.
Figure 15:
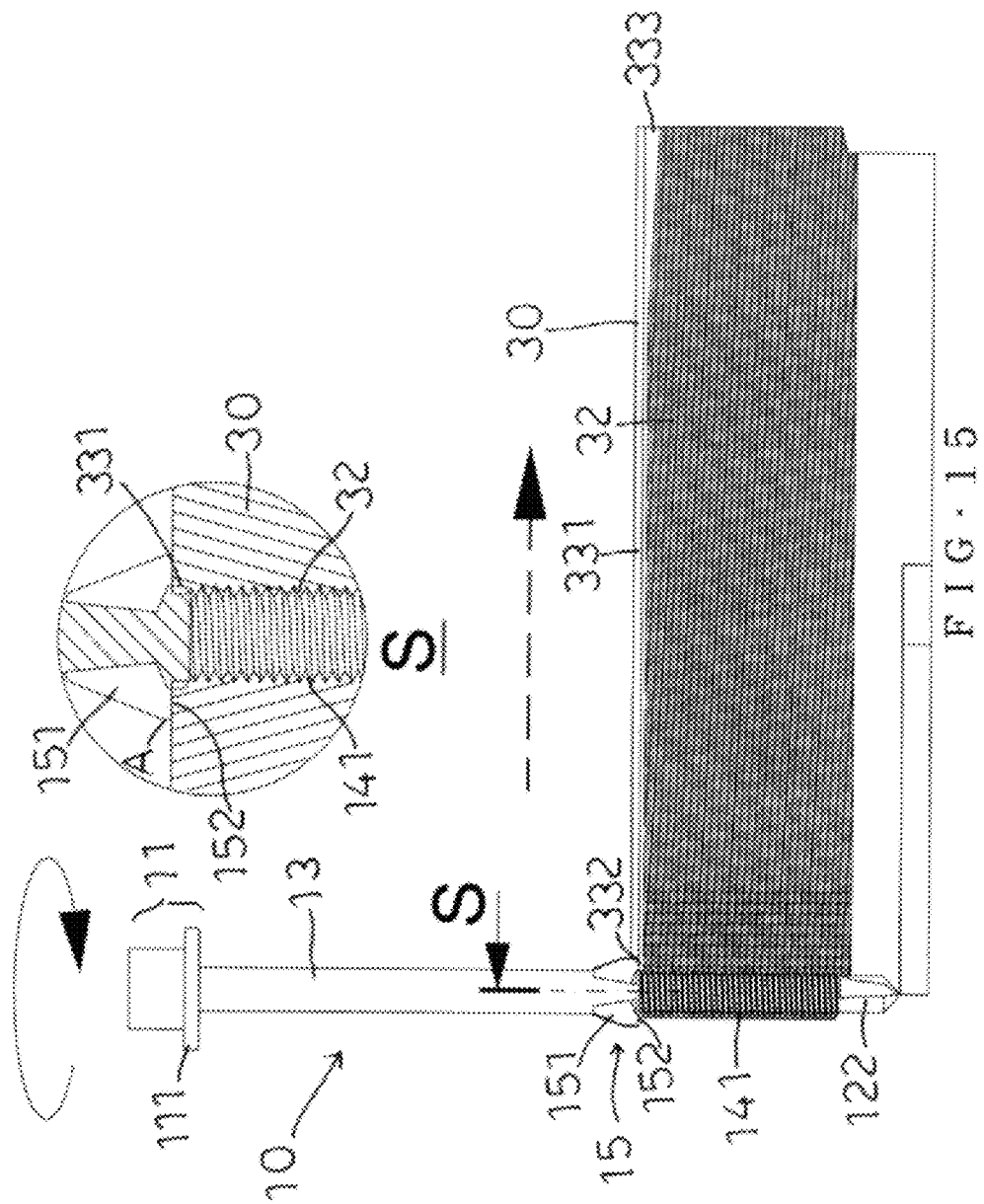
FIG. 15 is a plane operational view showing the finished state of the threading process of the thrust screw, and a cross-sectional view taken along mark "S".

As shown in FIG. 14, the drill tip 122 of the thrust screw 10 is received in the evasion opening 34 of each of the two threading dies 30 during threading of the external thread 141 and during cut forming of the two flat portions 152, such that the drill tip 122 of the thrust screw 10 is not damaged during working of the two threading dies 30.

Referring to FIG. 16, the thrust screw 10 is initially formed with the restriction portion 111 of the head 11, the first shank 13, and the second shank 14. Then, the thrust screw 10 is formed with the drill tip 122 of the drilling member 12. Then, the thrust screw 10 is formed with the two wing-shaped stop pieces 151 of the thrust member 15. Then, the thrust screw 10 is formed with the external thread 141 of the second shank 14 and the two flat portions 152 of the thrust member 15 simultaneously. Finally, the thrust screw 10 is formed with the rotation portion 112 and the through hole 113 of the head 11.

Accordingly, the two flat portions 152 have an outer diameter greater than that of the external thread 141, to stop a further screwing motion of the external thread 141. In addition, the thrust screw 10 is integrally formed with the external thread 141 and the thrust member 15, to decrease the cost of fabrication, and to enhance the strength of the thrust screw 10. Further, the thrust screw 10 is formed integrally with the thrust member 15, such that the external thread 141 is not screwed or locked too deeply due to a defective working or assembling process or due to an improper operation of the user, thereby preventing the thrust screw 10 from being broken or worn out during operation.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A thrust screw assembly comprising:
a thrust screw; and
two threading dies for working the thrust screw;
wherein:
the thrust screw includes a head, a first shank, a second shank, and a drilling member;
the first shank and the second shank are arranged between the head and the drilling member;
the second shank is provided with an external thread;
the first shank is provided with a thrust member;
the thrust member includes two wing-shaped stop pieces and two flat portions;
the two flat portions have an outer diameter greater than that of the external thread;
the two flat portions of the thrust member stop a further screwing motion of the external thread;
each of the two threading dies is provided with an external thread forming section corresponding to the external thread of the thrust screw;
each of the two threading dies is provided with a flat portion forming section corresponding to the thrust member of the thrust screw;
the flat portion forming section is provided with a cutting groove;
the flat portion forming section has a first end provided with a narrow portion, and a second end provided with a wide portion;
the flat portion forming section has a dimension increased gradually from the narrow portion to the wide portion;
in a first molding process, the first shank is worked by stamping to form the thrust member with the two wing-shaped stop pieces;
in a second molding process, the second shank is processed by the external thread forming section of each of the two threading dies to form the external thread on the second shank, and the two wing-shaped stop pieces is processed by the flat portion forming section of each of the two threading dies to form the two flat portions on the two wing-shaped stop pieces simultaneously; and
the cutting groove cuts the highest point of an outer edge of each of the two wing-shaped stop pieces into each of the two flat portions.

2. The thrust screw assembly of claim 1, wherein the drilling member includes a pointed portion or a drill tip.

3. The thrust screw assembly of claim 1, wherein the thrust screw further includes a washer mounted on the first shank and located under the head, and an elastic cushion mounted on the first shank and located under the washer.

4. The thrust screw assembly of claim 1, wherein the thrust screw further includes a third shank located between the thrust member and the external thread.

5. The thrust screw assembly of claim 1, wherein the head is provided with a restriction portion disposed horizontally, and the restriction portion is provided with a rotation portion disposed vertically.

6. The thrust screw assembly of claim 5, wherein the rotation portion is a sheet plate and is provided with a through hole.

7. The thrust screw assembly of claim 5, wherein the rotation portion is a hexagonal nut.

8. The thrust screw assembly of claim 5, wherein the rotation portion has a circular shape and is provided with a hexagonal driving slot.

* * * * *